(12) United States Patent
Atarashi et al.

(10) Patent No.: US 7,622,875 B2
(45) Date of Patent: Nov. 24, 2009

(54) CONTROLLER FOR MOTOR

(75) Inventors: Hirofumi Atarashi, Wako (JP);
Hiromitsu Sato, Wako (JP); Masanari Fukuchi, Wako (JP); Masaaki Kaizuka, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 312 days.

(21) Appl. No.: 11/826,254

(22) Filed: Jul. 13, 2007

(65) Prior Publication Data

US 2008/0018291 A1     Jan. 24, 2008

(30) Foreign Application Priority Data

Jul. 24, 2006    (JP)   ............... 2006-200513

(51) Int. Cl.
*H02P 25/00* (2006.01)

(52) U.S. Cl. .............. 318/400.41; 318/700; 310/154.33

(58) Field of Classification Search ............ 318/400.41, 318/700; 310/154.33
See application file for complete search history.

(56) References Cited

U.S. PATENT DOCUMENTS

| | | | |
|---|---|---|---|
| 4,305,031 A | 12/1981 | Wharton | |
| 5,245,238 A | 9/1993 | Lynch et al. | |
| 5,281,879 A * | 1/1994 | Satake et al. | 310/114 |
| 6,563,246 B1 | 5/2003 | Kajiura et al. | |
| 7,288,910 B2 * | 10/2007 | Dooley | 318/400.21 |

FOREIGN PATENT DOCUMENTS

JP     2002-204541     7/2002

\* cited by examiner

*Primary Examiner*—Bentsu Ro
*Assistant Examiner*—David S Luo
(74) *Attorney, Agent, or Firm*—Arent Fox LLP

(57) ABSTRACT

A change in torque produced by a motor having two rotors is reduced when the motor operates in a low-velocity and low-torque operational state. The motor has a first rotor and a second rotor, each of which has a permanent magnet, and an output shaft capable of rotating integrally with the first rotor. The second rotor can relatively rotate with respect to the first rotor by a driving force from a phase difference changing driving device, and the phase difference between the rotors (rotor phase difference) can be changed by the relative rotation of the second rotor with respect to the first rotor. When the values of the torque and the rotational velocity of the motor lie within a predetermined region in the proximity of 0, the phase difference changing driving device adjusts the rotor phase difference to a predetermined phase difference for which the strength of a composite field of the permanent magnets is lower than a maximum strength.

8 Claims, 10 Drawing Sheets

CONTROLLER FOR MOTOR

BACKGROUND OF THE INVENTION

1. Field of the Invention

The present invention relates to a controller for a motor that has two rotors each of which produces a field by a permanent magnet and can change the phase difference between the rotors.

2. Description of the Related Art

As a permanent magnet type motor, there has been known a double rotor type motor that has two rotors that are coaxially disposed and each have a permanent magnet for producing a field (for example, see Japanese Patent Application Publication No. 2002-204541 (referred to as Patent Document 1 hereinafter)). In the motor of this type, the two rotors can relatively rotate with respect to each other about the axis thereof, and the phase difference between the rotors can be changed by the relative rotation. By changing the phase difference between the rotors, the strength of a composite field (the magnitude of magnetic fluxes) of the fields produced by the permanent magnets of the rotors can be changed.

The motor disclosed in the Patent Document 1 is mechanically configured so that the phase difference between the rotors changes according to the rotational velocity of the motor. That is, the rotors are connected to each other via a member that is displaced in the radial direction of the motor by the action of a centrifugal force. One of the rotors is capable of integrally rotating with the output shaft of the motor for outputting the torque produced by the motor to the outside. When the member described above is displaced, the other rotor relatively rotates with respect to the rotor capable of rotating integrally with the output shaft, and thus the phase difference between the rotors changes. In this case, the permanent magnets of the rotors are disposed in such a manner that, when the motor is halted, the directions of the magnetic poles (the directions of the magnetic fluxes) of the permanent magnets of the rotors are the same, and the strength of the composite field of the permanent magnets is maximized. As the rotational velocity of the motor increases, the phase difference between the rotors changes by the action of the centrifugal force, and the strength of the composite field of the permanent magnets of the rotors decreases.

For example, for a vehicle on which a motor is mounted as a propulsion force generating source (an electric-powered vehicle), the required maximum value of the torque of the motor is high particularly in a low velocity range, and thus, a motor whose strength of the field of the permanent magnets of the rotors is high is typically used so that a large torque can be produced.

However, for the motor whose strength of the field of the permanent magnets of the rotors is high, a periodic change in produced torque (a so-called torque ripple) is likely to remarkably occur particularly in an operational state of the motor in which the rotational velocity of the output shaft of the motor is low, and the produced torque is low (sometimes referred to as low-velocity and low-torque operational state, hereinafter). For example, as shown by dashed line in FIG. 10, a torque change having a large amplitude relative to the magnitude of the produced torque is likely to occur. In FIG. 10, the axis of abscissas indicates the rotational position (rotational angle) of the output shaft of the motor, and the axis of ordinates indicates the torque.

Such a vehicle having the motor as the propulsion force generating source is likely to vibrate when the vehicle is creeping in situations, such as traffic congestion and slow speed driving, or immediately after start moving (when the vehicle runs on a low torque produced by the motor as an idling torque of the motor in a state where the accelerator of the vehicle is not manipulated). Complementally, in general, in an operational state in which the rotational velocity of the output shaft of the motor is relatively high, a change in torque produced by the motor is sufficiently reduced by the action of an inertial force produced by the rotation of the output shaft even if the produced torque is relatively low.

Therefore, it is desirable to reduce a change in torque (torque ripple) produced by the motor in the low-velocity and low-torque operational state.

However, ordinary permanent magnet type motor having a single rotor cannot change the strength of the field of the permanent magnet, and therefore, it is difficult to reduce a change in torque produced by the motor in the low-velocity and low-torque operational state.

Even if the double rotor type motor such as one disclosed in the Patent Document 1 is used, the strength of the composite field of the permanent magnets of the rotors in the low-velocity and low-torque operational state is substantially kept at the maximum strength. This is because the motor disclosed in the Patent Document 1 uses a centrifugal force to mechanically cause relative rotation of the rotors, and therefore, in the low-velocity and low-torque operational state where a centrifugal force hardly occurs, the phase difference between the rotors is substantially kept at the phase difference for which the strength of the composite field is maximized. Therefore, the motor disclosed in the Patent Document 1 cannot reduce a change in produced torque in the low-velocity and low-torque operational state.

SUMMARY OF THE INVENTION

The present invention has been made in view of such circumstances, and it is an object of the present invention to provide a controller for a motor having two rotors that can reduce a change in torque produced by the motor when the motor operates at a low velocity with a low torque. It is another object of the present invention to provide a controller for a motor mounted on a vehicle as a propulsion force generating source that can reduce a change in torque produced by the motor when the vehicle is creeping, thereby reducing vibrations of the vehicle.

In order to attain the objects, according to the present invention, there is provided a controller for a motor that has a first rotor and a second rotor, each of which produces a field (or a magnet field made of a field) by a permanent magnet, and an output shaft capable of rotating integrally with the first rotor of the rotors, which are coaxially disposed, the second rotor being capable of relatively rotating with respect to the first rotor, and the strength of a composite field of the fields of the permanent magnets of the rotors being capable of being changed by changing the phase difference between the rotors by the relative rotation of the second rotor, the controller comprising: a phase difference changing driving means that has an actuator that produces a driving force to make the second rotor relatively rotate with respect to the first rotor; and a phase difference controlling means for controlling the phase difference between the rotors to a predetermined phase difference for which the strength of the composite field is lower than a maximum strength thereof via the phase difference changing driving means in the case where a point on a two-axis coordinate plane, whose coordinate axes indicate the torque produced on the output shaft and the rotational velocity of the output shaft, that represents a set of the value of the torque produced on the output shaft and the value of the rotational velocity of the output shaft lies within a preset predetermined region on the two-axis coordinate plane that is in the proximity of and includes the origin of the two-axis coordinate plane (a first aspect of the present invention).

The term "origin" means a point where the value of the torque is 0, and the value of the rotational velocity is 0.

Furthermore, according to the present invention, there is provided a controller for a motor that has a first rotor and a second rotor, each of which produces a field by a permanent magnet, and an output shaft capable of rotating integrally with the first rotor of the rotors, which are coaxially disposed, the second rotor being capable of relatively rotating with respect to the first rotor, and the strength of a composite field of the fields of the permanent magnets of the rotors being capable of being changed by changing the phase difference between the rotors by the relative rotation of the second rotor, the controller comprising: a phase difference changing driving means that has an actuator that produces a driving force to make the second rotor relatively rotate with respect to the first rotor; and a phase difference controlling means for controlling the phase difference between the rotors to a predetermined phase difference for which the strength of the composite field is lower than a maximum strength thereof via the phase difference changing driving means in the case where the absolute value of the value of the torque produced on the output shaft is equal to or less than a predetermined set torque, and the value of the rotational velocity of the output shaft is equal to or less than a predetermined set velocity (a second aspect of the present invention).

According to the first and second aspects, since the phase difference changing driving means is provided, the phase difference between the rotors can be adjusted to a desired phase difference by means of the phase difference changing driving means.

According to the first aspect, when the point on the two-axis coordinate plane corresponding to the set of the value of the torque produced on the output shaft and the value of the rotational velocity of the output shaft lies within the predetermined region, the phase difference controlling means makes the phase difference changing driving means adjust the phase difference between the rotors of the motor to the predetermined phase difference. According to the second aspect, when the absolute value of the value of the torque produced on the output shaft is equal to or less than the predetermined set torque, and the value of the rotational velocity of the output shaft is equal to or less than the predetermined set velocity, the phase difference controlling means makes the phase difference changing driving means adjust the phase difference between the rotors of the motor to the predetermined phase difference.

The predetermined region in the first aspect is a region in the proximity of the origin of the two-axis coordinate plane. Therefore, if the point on the two-axis coordinate plane corresponding to the set of the value of the torque produced on the output shaft and the value of the rotational velocity of the output shaft lies within the predetermined region, it means that both the values of the torque and the rotational velocity are close to 0. In other words, it means that the operational state of the motor is the low-velocity and low-torque operational state. Similarly, in the second aspect, if the absolute value of the value of the torque produced on the output shaft is equal to or less than the predetermined set torque, and the value of the rotational velocity of the output shaft is equal to or less than the predetermined set velocity, it means that the operational state of the motor is the low-velocity and low-torque operational state.

In both the first and second aspects, the predetermined phase difference is a phase difference for which the strength of the composite field is lower than a maximum strength thereof.

Thus, the strength of the composite field in the low-velocity and low-torque operational state can be reduced. As a result, according to the first or second aspect, a change in torque produced by the motor in the low-velocity and low-torque operational state can be reduced.

Complementally, since the torque produced on the output shaft of the motor is low in the low-velocity and low-torque operational state, a required torque can be produced by the motor without any problem even if the strength of the composite field is relatively low.

Furthermore, for example, the predetermined region in the first aspect can be determined to be a region in which the rotational velocity of the output shaft of the motor is equal to or less than a predetermined value, and the magnitude (absolute value) of the produced torque is equal to or less than a predetermined value, that is, a rectangular region on the two-axis coordinate plane. However, the predetermined region is not limited to such a rectangular region. For example, the predetermined region may be a semi-circular region or a polygonal region other than the rectangular region on the two-axis coordinate plane. Generally speaking, it is essential only that the predetermined region is determined so that the point on the two-axis coordinate plane that corresponds to a set of torque value and rotational velocity value of any sets of torque value and rotational velocity value for which the produced torque has to be reduced lies within the predetermined region.

In the first or second aspect, to sufficiently reduce a change in torque produced by the motor, the predetermined phase difference can be set at a phase difference for which the strength of the composite field is minimized. However, in this case, there is a possibility that, in a situation where the motor is required to produce a large torque (and therefore, the strength of the composite field is required to be high), it is difficult to quickly produce the required large torque on the output shaft of the motor because of a time required by the phase difference changing driving means to change the phase difference between the rotors to a phase difference for which the strength of the composite field is higher.

Thus, in the first or second aspect, it is preferred that the predetermined phase difference is set at a phase difference for which the strength of the composite field is higher than a minimum strength thereof (a third aspect of the present invention).

According to the third aspect, in the case where a situation where the motor is required to produce a large torque occurs when the motor operates in the low-velocity and low-torque operational state, the phase difference between the rotors can be quickly changed by the phase difference changing driving means to a phase difference for which the strength of the composite field is higher.

In this case, the predetermined phase difference can be set taking into account the tradeoff between the degree of reduction of a change in torque produced by the motor in the low-velocity and low-torque operational state and the responsibility of change of the phase difference between the rotors by the phase difference changing driving means.

In the first aspect, it is preferred that, in the case where the point on the two-axis coordinate plane corresponding to the set of the value of the torque produced on the output shaft and the value of the rotational velocity of the output shaft does not lie within the predetermined region, the phase difference controlling means controls the rotor phase difference via the phase difference changing driving means so that the strength of the composite field increases as the absolute value of the value of the torque produced on the output shaft increases (a fourth aspect of the present invention).

Similarly, in the second aspect, it is preferred that, in the case where the absolute value of the value of the torque produced on the output shaft exceeds the predetermined set torque, or in the case where the rotational velocity of the output shaft exceeds the predetermined set velocity, the phase difference controlling means controls the rotor phase difference via the phase difference changing driving means so that the strength of the composite field increases as the absolute value of the value of the torque produced on the output shaft increases (a fifth aspect of the present invention).

According to the fourth aspect, when the point on the two-axis coordinate plane that corresponds to the set of the value of the torque produced on the output shaft of the motor and the value of the rotational velocity of the output shaft does not lie within the predetermined region, that is, when the motor operates in a state other than the low-velocity and low-torque operational state, the phase difference controlling means makes the phase difference changing driving means control the phase difference between the rotors so that the strength of the composite field increases as the absolute value of the value of the torque produced on the output shaft increases. Similarly, according to the fifth aspect, when the absolute value of the value of the torque produced on the output shaft of the motor exceeds the predetermined set torque, or the rotational velocity of the output shaft exceeds the predetermined set velocity, that is, when the motor operates in a state other than the low-velocity and low-torque operational state, the phase difference controlling means makes the phase difference changing driving means control the phase difference between the rotors so that the strength of the composite field increases as the absolute value of the value of the torque produced on the output shaft increases.

Thus, a composite field suitable for the torque produced on the output shaft of the motor can be produced.

The fourth and fifth aspects can be combined with the third aspect.

Furthermore, in order to attain the objects described above, according to the present invention, there is provided a controller for a motor mounted on a vehicle as a propulsion force generating source, the motor having a first rotor and a second rotor, each of which produces a field by a permanent magnet, and an output shaft capable of rotating integrally with the first rotor of the rotors, which are coaxially disposed, the second rotor being capable of relatively rotating with respect to the first rotor, and the strength of a composite field of the fields of the permanent magnets of the rotors being capable of being changed by changing the phase difference between the rotors by the relative rotation of the second rotor, the controller comprising: a phase difference changing driving means for making the second rotor relatively rotate with respect to the first rotor; and a phase difference controlling means for controlling the phase difference between the rotors of the motor to a predetermined phase difference for which the strength of the composite field is lower than a maximum strength thereof via the phase difference changing driving means at least in the case where the vehicle is creeping by the action of a torque produced by the motor (a sixth aspect of the present invention).

The term "creeping" means an operational state of the vehicle in which the vehicle runs on a low torque produced by the motor as an idling torque of the motor in a state where the accelerator of the vehicle is not manipulated, as described above.

According to the sixth aspect, since the phase difference changing driving means is provided, as in the first or second aspect, the phase difference between the rotors can be adjusted to a desired phase difference by the phase difference changing driving means. The operational state of the motor at the time when the vehicle is creeping is equivalent to the low-velocity and low-torque operational state. Thus, in the sixth aspect, the phase difference controlling means makes the phase difference changing driving means adjust the phase difference between the rotors of the motor to the predetermined phase difference at least during the creeping.

In this case, since the strength of the composite field is lower than the maximum strength thereof for the predetermined phase difference, the strength of the composite field can be reduced during the creeping. As a result, according to the sixth aspect, when the vehicle is creeping, a change in torque produced by the motor can be reduced, and therefore vibrations of the vehicle can be reduced.

In the sixth aspect, for the same reason as in the third aspect, it is preferred that the predetermined phase difference is set at a phase difference for which the strength of the composite field is higher than a minimum strength thereof (a seventh aspect of the present invention).

According to the seventh aspect, in a case where a situation occurs in which the accelerator of the vehicle is largely manipulated when the vehicle is creeping, and the motor is required to produce a large torque, the phase difference between the rotors can be quickly changed to a phase difference for which the strength of the composite field is higher by the phase difference changing driving means.

In the first to seventh aspects, a command value (target value) of the torque of the motor can be used as the value of the torque. However, in a case where the torque produced on the output shaft of the motor is detected by an appropriate sensor, the detection value can be used. Furthermore, as the value of the rotational velocity, a detection value of an appropriate sensor can be used. However, in a case where there is no means for directly detecting the rotational velocity, an estimated value determined using a model or the like can be used.

DETAILED DESCRIPTION OF THE PREFERRED EMBODIMENTS

An embodiment of the present invention will be described with reference to FIGS. 1 to 10.

Figure 1:
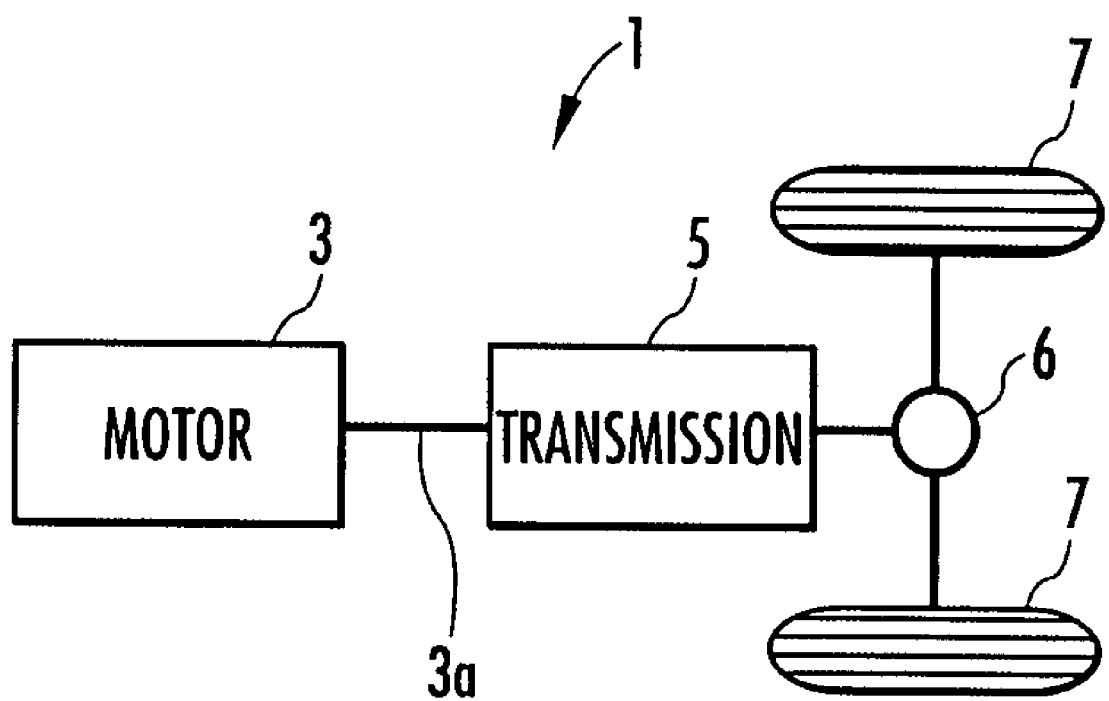
FIG. 1 is a schematic diagram showing a configuration of a vehicle on which a device according to an embodiment of the present invention is mounted.

FIG. 1 is a schematic diagram showing a configuration of a vehicle on which a device according to this embodiment is mounted.

As shown in this drawing, a vehicle 1 is an electric-powered vehicle and has a motor 3 serving as a propulsion force generating source for the vehicle 1 and a transmission 5 for transmitting a torque produced by the motor 3 to drive wheels 7, 7 of the vehicle 1.

An output shaft 3a of the motor 3 is connected to an input end of the transmission 5. An output end of the transmission 5 is connected to the drive wheels 7, 7 of the vehicle 1 via a differential gear unit 6. Thus, the torque on the output shaft 3a of the motor 3 (a power running torque or a regenerative torque) is transmitted to the drive wheels 7, 7 via the transmission 5 and the differential gear unit 6.

The transmission 5 is constituted by an automatic gear box with a torque converter, a CVT or the like.

Figure 2:
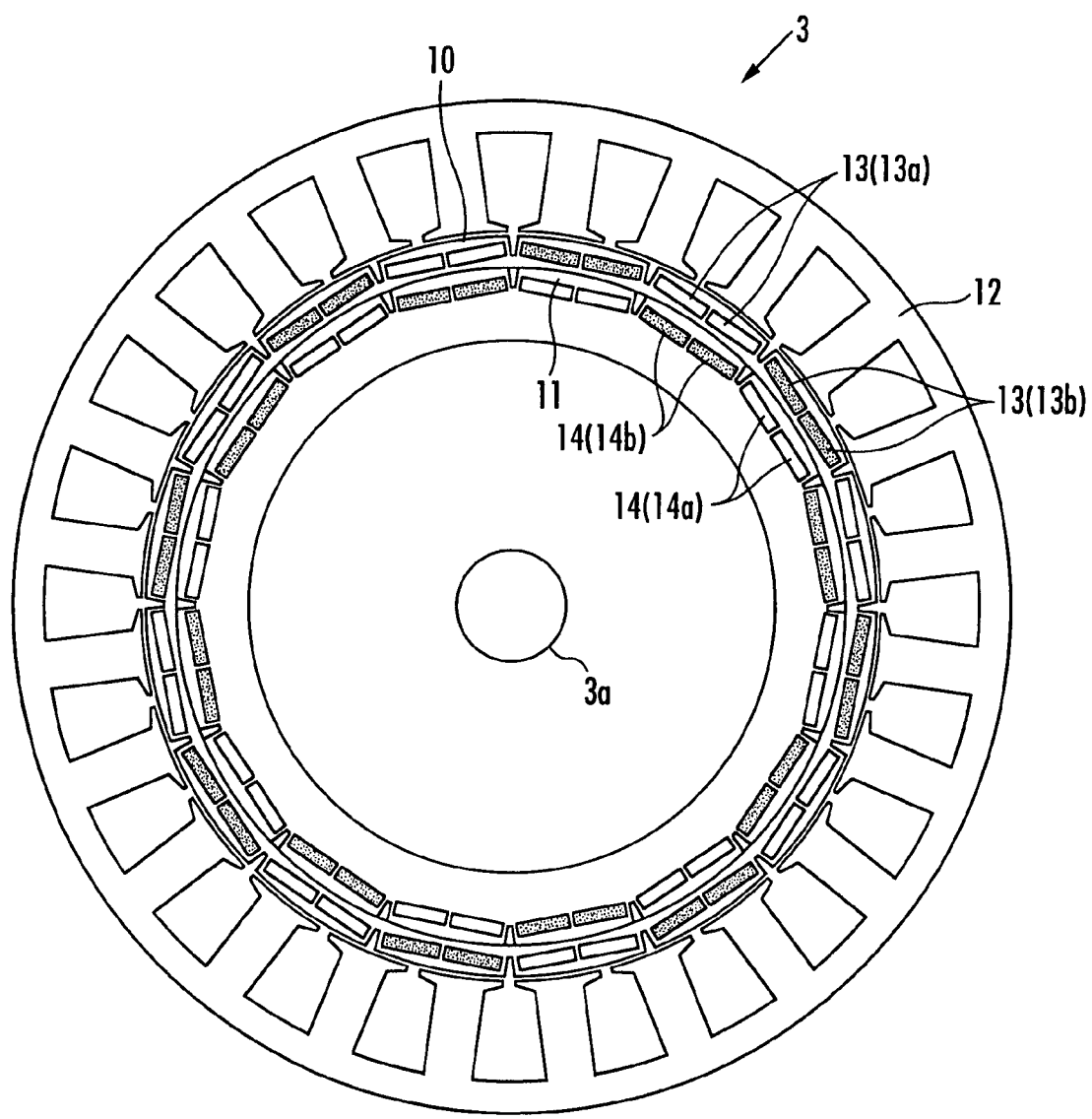
FIG. 2 is a diagram showing essential parts of a motor according to the embodiment, which is seen along the axis of the motor.
Figure 3:
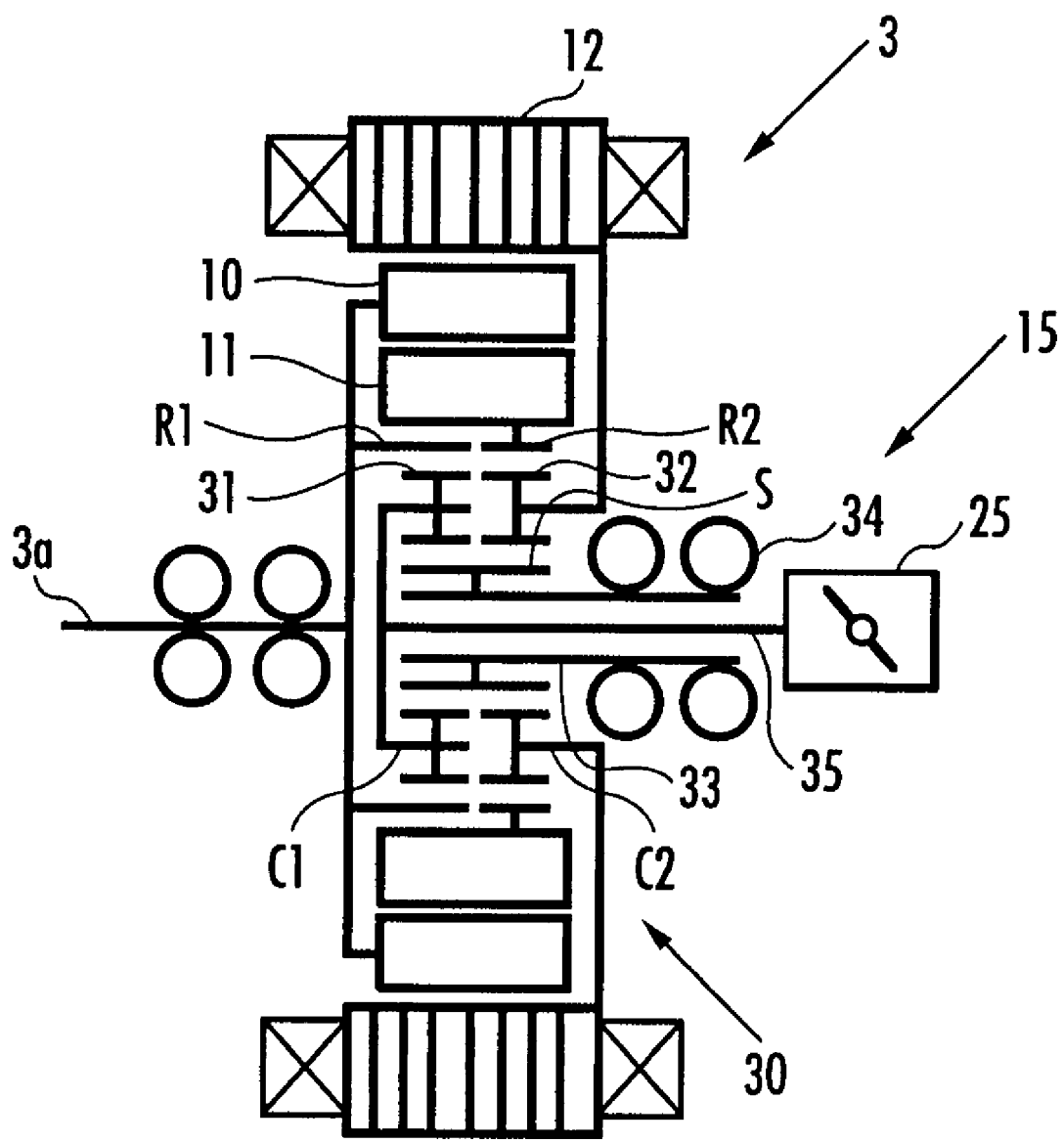
FIG. 3 is a skeleton diagram showing a driving mechanism for changing the phase difference between two rotors of the motor shown in FIG. 2.

Now, a schematic configuration of the motor 3 will be described with reference to FIGS. 2 and 3. FIG. 2 is a diagram showing essential parts of the motor 3, which is seen along the axis of the motor 3. FIG. 3 is a skeleton diagram showing a driving mechanism for changing the phase difference between two rotors of the motor 3. In FIG. 2, illustration of the driving mechanism is omitted.

Referring to FIG. 2, the motor 3 is a DC brushless motor of a double rotor structure and has an outer rotor 10, which is a first rotor, and an inner rotor 11, which is a second rotor, which are disposed coaxially with the output shaft 3a. A stator 12 is disposed at the outer side of the outer rotor 10 and fixed to a housing (not shown) of the motor 3, and armatures (armatures for three phases, not shown) is attached to the stator 12.

The outer rotor 10 has an annular shape and has a plurality of permanent magnets 13 disposed at regular intervals along the circumference thereof. The permanent magnets 13 have the shape of an elongated rectangular plate and are embedded in the outer rotor 10 in such a position that the longitudinal direction agrees with the axial direction of the outer rotor 10, and the normal direction agrees with the radial direction of the outer rotor 10.

The inner rotor 11 also has an annular shape. The inner rotor 11 is disposed inside the outer rotor 10 coaxially with the outer rotor 10 with the outer surface thereof being in sliding contact with the inner surface of the outer rotor 10. A slight clearance may be formed between the outer surface of the inner rotor 11 and the inner surface of the outer rotor 10. Furthermore, the output shaft 3a, which is coaxial with the inner rotor 11 and the outer rotor 10, passes through the radial center of the inner rotor 11.

The inner rotor 11 has a plurality of permanent magnets disposed at regular intervals along the circumference thereof. The permanent magnets 14 have the same shape as the permanent magnets 13 of the outer rotor 10 and embedded in the inner rotor 11 in the same position as the permanent magnets 13 of the outer rotor 10. The number of the permanent magnets 14 of the inner rotor 11 is equal to the number of the permanent magnets 13 of the outer rotor 10.

Referring to FIG. 2, of the permanent magnets 13 of the outer rotor 10, permanent magnets 13a shown without shading and permanent magnets 13b shown with shading are opposite in direction of the magnetic pole in the radial direction of the outer rotor 10. For example, the permanent magnets 13a are positioned so that the N pole is on the outer side thereof (the side of the outer surface of the outer rotor 10), and the S pole is on the inner side thereof (the side of the inner surface of the outer rotor 10), and the permanent magnets 13b are positioned so that the S pole is on the outer side thereof, and the N pole is on the inner side thereof. Similarly, of the permanent magnets 14 of the inner rotor 11, permanent magnets 14a shown without shading and permanent magnets 14b shown with shading are opposite in direction of the magnetic pole in the radial direction of the inner rotor 11. For example, the permanent magnets 14a are positioned so that the N pole is on the outer side thereof (the side of the outer surface of the inner rotor 11), and the S pole is on the inner side thereof (the side of the inner surface of the inner rotor 11), and the permanent magnets 14b are positioned so that the S pole is on the outer side thereof, and the N pole is on the inner side thereof.

According to this embodiment, in the outer rotor 10, pairs of permanent magnets 13a, 13a adjacent to each other and pairs of permanent magnets 13b, 13b adjacent to each other are alternately disposed along the circumference of the outer rotor 10. Similarly, in the inner rotor 11, pairs of permanent magnets 14a, 14a adjacent to each other and pairs of permanent magnets 14b, 14b adjacent to each other are alternately disposed along the circumference of the inner rotor 11.

Referring to FIG. 3, the outer rotor 10 is connected to the output shaft 3a of the motor 3 so that the outer rotor 10 can rotate integrally with the output shaft 3a. The inner rotor 11 is provided so that the inner rotor 11 can relatively rotate with respect to the outer rotor 10 and the output shaft 3a. The phase difference between the inner rotor 11 and the outer rotor 10 can be changed by the relative rotation of the inner rotor 11. According to this embodiment, as phase difference changing means for causing a relative rotation of the inner rotor 11 (for changing the phase difference between the rotors 10 and 11), there is provided a phase difference changer 15 having a planetary gear mechanism 30, for example.

The planetary gear mechanism 30 in the phase difference changer 15 is disposed in a hollow portion in the inner rotor 11. According to this embodiment, the planetary gear mechanism 30 is of a single-pinion type and has a first ring gear R1 fixed to the outer rotor 10 so that the first ring gear R1 can rotate integrally with the outer rotor 10 and a second ring gear R2 fixed to the inner rotor 11 so that the second ring gear R2 can rotate integrally with the inner rotor 11, which are disposed coaxially with the inner rotor 11 and the outer rotor 10. The ring gears R1 and R2 are disposed in the axial direction thereof. A common sun gear S is disposed along the center axis of the ring gears R1 and R2, and a sun gear shaft 33 integral with the sun gear S is rotatably supported by a plurality of bearings 34.

A plurality of first planetary gears 31, which engage with the sun gear S and the first ring gear R1, are disposed between the sun gear S and the first ring gear R1. The first planetary gears 31 are rotatably held by a first carrier C1. In this case, the first carrier C1 is capable of rotating about the axis of the sun gear S, and rotation of the first carrier C1 allows revolution of each first planetary gear 31 about the sun gear S.

Furthermore, a plurality of second planetary gears 32, which engage with the sun gear S and the second ring gear R2, are disposed between the sun gear S and the second ring gear R2. The second planetary gears 32 are rotatably held by a second carrier C2. In this case, the second carrier C2 is fixed to the stator 12 (or the housing) of the motor 3 and cannot rotate.

The gear ratios of the sun gear S to the first ring gear R1 and the first planetary gear 31 are equal to the gear ratios of the sun gear S to the second ring gear R2 and the second planetary gear 32.

In the planetary gear mechanism 30 configured as described above, in a state where the first carrier C1 is prevented from rotating, if the output shaft 3a of the motor 3 and the outer rotor 10 rotate, the inner rotor 11 and the second ring gear R2 integrally rotate at the same velocity and in the same direction as the output shaft 3a and the outer rotor 10. Thus, the inner rotor 11 and the outer rotor 10 rotate integrally. Then, when the first carrier C1 is driven to rotate, the inner rotor 11 relatively rotates with respect to the outer rotor 10. Thus, the phase difference between the inner rotor 11 and the outer rotor 10 (referred to as rotor phase difference, hereinafter) changes.

Thus, the phase difference changer 15 according to this embodiment changes the rotor phase difference by driving the first carrier C1 in the planetary gear mechanism 30 to rotate with an actuator 25 (rotational driving force source), such as a motor or a hydraulic actuator. In this case, the actuator 25 is connected to the first carrier C1 via a drive shaft 35 rotatable integrally with the first carrier C1 and applies a rotational force (torque) to the first carrier C1 via the drive shaft 35.

Mechanical configurations of the motor 3 and the phase difference changer 15 for the motor 3 according to this embodiment have been described above.

While the single-pinion planetary gear mechanism 30 is used in this embodiment, a double-pinion planetary gear mechanism may be used, for example. While the output shaft 3a of the motor 3 and the outer rotor 10 are configured to rotate integrally in this embodiment, the output shaft 3a of the motor 3 and the inner rotor 11 may rotate integrally, and the outer rotor 10 may rotate relatively with respect to the output shaft 3a and the inner rotor 11. Furthermore, the configuration of the phase difference changer 15 is not limited to the configuration described above. For example, a hydraulic chamber may be formed by a vane rotor or the like inside the inner rotor 11, and the inner rotor 11 may be made to relatively rotate with respect to the outer rotor 10 by adjusting the pressure in the hydraulic chamber.

Figure 4A:
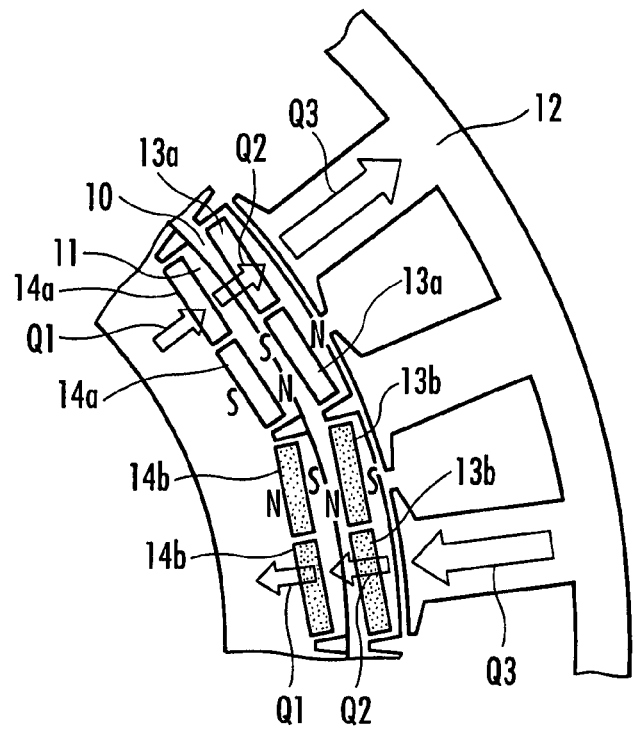
FIG. 4(a) is a diagram showing a phase relationship between the two rotors of the motor shown in FIG. 2 in a maximum field state.

The phase difference changer 15 makes the inner rotor 11 relatively rotate with respect to the outer rotor 10, thereby changing the rotor phase difference, and as a result, the strength of a composite field (a field in the radial direction toward the stator 12) (the strength of magnetic fluxes of the composite field) of a field produced by the permanent magnets 14a and 14b of the inner rotor 11 and a field produced by the permanent magnets 13a and 13b of the outer rotor 10 changes. Hereinafter, a state where the strength of the composite field is at the maximum will be referred to as maximum field state, and a state where the strength of the composite field is at the minimum will be referred to as minimum field state. FIG. 4(a) is a diagram showing a phase relationship between the inner rotor 11 and the outer rotor 10 in the maximum field state, and FIG. 4(b) is a diagram showing a phase relationship between the inner rotor 11 and the outer rotor 10 in the minimum field state.

As shown in FIG. 4(a), the maximum field state is a state where the permanent magnets 14a and 14b of the inner rotor 11 and the permanent magnets 13a and 13b of the outer rotor 10 face each other with the opposite magnetic poles facing each other. More specifically, in this maximum field state, the permanent magnets 14a of the inner rotor 11 face the permanent magnets 13a of the outer rotor 10, and the permanent magnets 14b of the inner rotor 11 face the permanent magnets 13b of the outer rotor 10. In this state, the radial directions of magnetic fluxes Q1 of the permanent magnets 14a and 14b of the inner rotor 11 are the same as the radial directions of magnetic fluxes Q2 of the permanent magnets 13a and 13b of the outer rotor 10, respectively, and therefore, the strength of composite magnetic fluxes Q3 of the magnetic fluxes Q1 and Q2 (the strength of the composite field) is at the maximum. When the motor 3 is in a halt state, if the inner rotor 11 can freely rotate (if the actuator 25 applies no rotational force to the first carrier C1 of the planetary gear mechanism 30), the rotor phase difference is typically in an equilibrium state at the phase difference in the maximum field state.

Figure 4B:
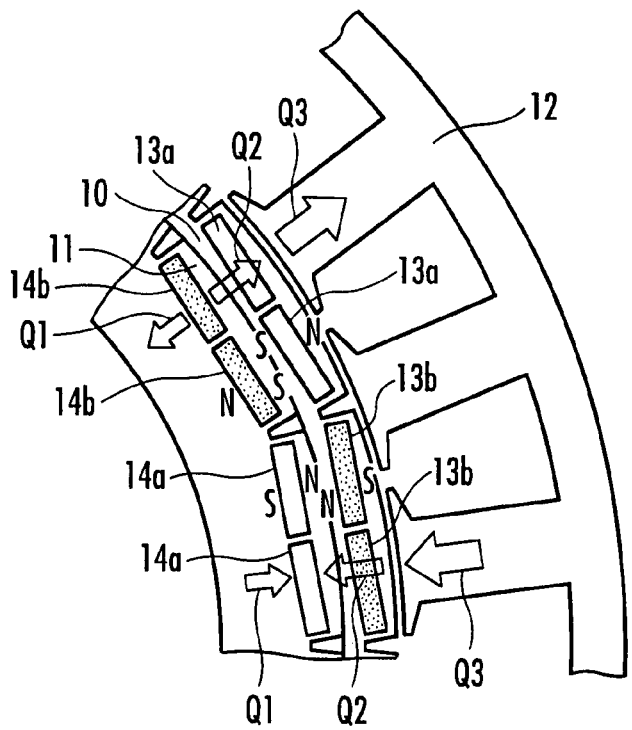
FIG. 4(b) is a diagram showing a phase relationship between the two rotors of the motor shown in FIG. 2 in a minimum field state.

As shown in FIG. 4(b), the minimum field state is a state where the permanent magnets 14a and 14b of the inner rotor 11 and the permanent magnets 13a and 13b of the outer rotor 10 face each other with the like magnetic poles facing each other. More specifically, in this minimum field state, the permanent magnets 14a of the inner rotor 11 face the permanent magnets 13b of the outer rotor 10, and the permanent magnets 14b of the inner rotor 11 face the permanent magnets 13a of the outer rotor 10. In this state, the radial directions of magnetic fluxes Q1 of the permanent magnets 14a and 14b of the inner rotor 11 are opposite to the radial directions of magnetic fluxes Q2 of the permanent magnets 13a and 13b of the outer rotor 10, respectively, and therefore, the strength of composite magnetic fluxes Q3 of the magnetic fluxes Q1 and Q2 (the strength of the composite field) is at the minimum.

In this embodiment, the rotor phase difference in the maximum field state is defined as 0 [deg], and the rotor phase difference in the minimum field state is defined as 180 [deg].

Figure 5:
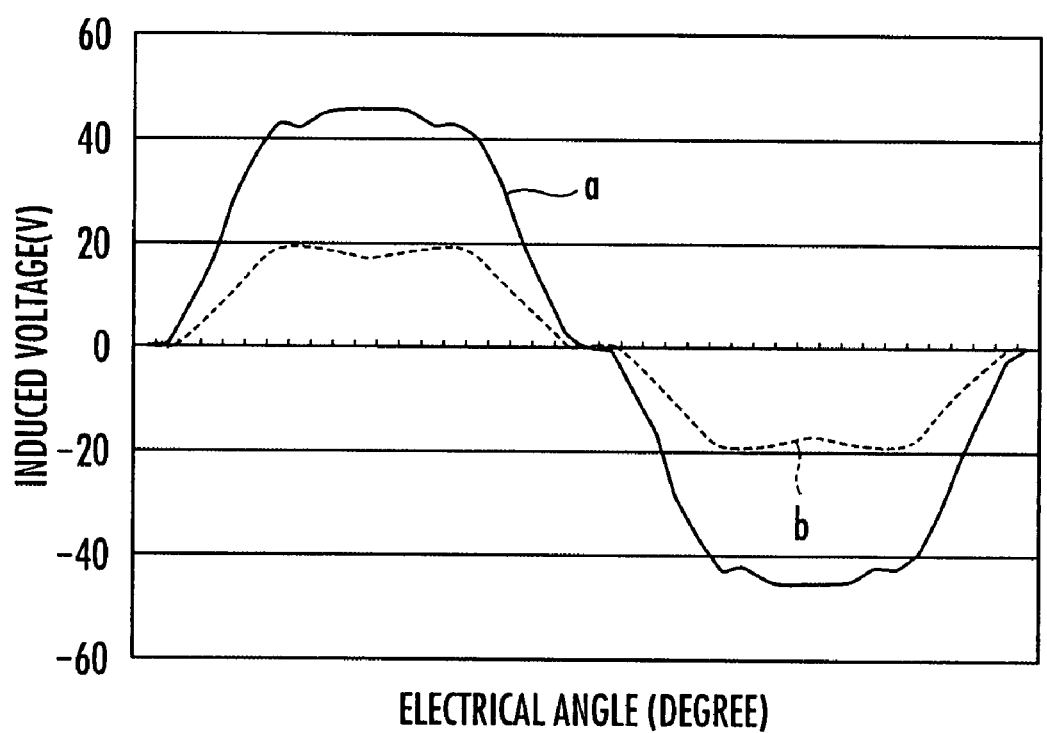
FIG. 5 shows graphs of an induced voltage in an armature of the motor shown in FIG. 2 in the maximum field state and the minimum field state.

FIG. 5 shows, for comparison, graphs of the induced voltage in an armature of the stator 12 in cases where the output shaft 3a of the motor 3 rotates at a predetermined rotational velocity in the maximum field state and the minimum field state. In this drawing, the axis of ordinates indicates the induced voltage [V], and the axis of abscissas indicates the rotational angle of the output shaft 3a in terms of electrical angle [degree]. The graph denoted by reference character "a" is a graph for the maximum field state (a state where the rotor phase difference=0 [deg]), and the graph denoted by reference character "b" is a graph for the minimum field state (a state where the rotor phase difference=180 [deg]). As can be seen from FIG. 5, the level of the induced voltage (amplitude level) can be changed by changing the rotor phase difference between 0 [deg] and 180 [deg]. As the rotor phase difference increases from 0 [deg] to 180 [deg], the strength of the composite field decreases, and accordingly, the level of the induced voltage also decreases.

In this way, an induced voltage constant of the motor 3 can be changed by changing the rotor phase difference to increase or decrease the strength of the field. The induced voltage constant is a proportional constant that defines a relationship between the angular velocity of the output shaft 3a of the motor 3 and the induced voltage in the armature according to the angular velocity. The value of the induced voltage constant decreases as the rotor phase difference increases from 0 [deg] to 180 [deg].

Complementally, of course, the rotor phase difference in the minimum field state (minimum-magnetic-field phase difference) may be defined as 0 [deg], and the rotor phase difference in the maximum field state (maximum-magnetic-field phase difference) may be defined as 180 [deg]. Generally speaking, the zero point of the rotor phase difference may be set arbitrarily.

Figure 6:
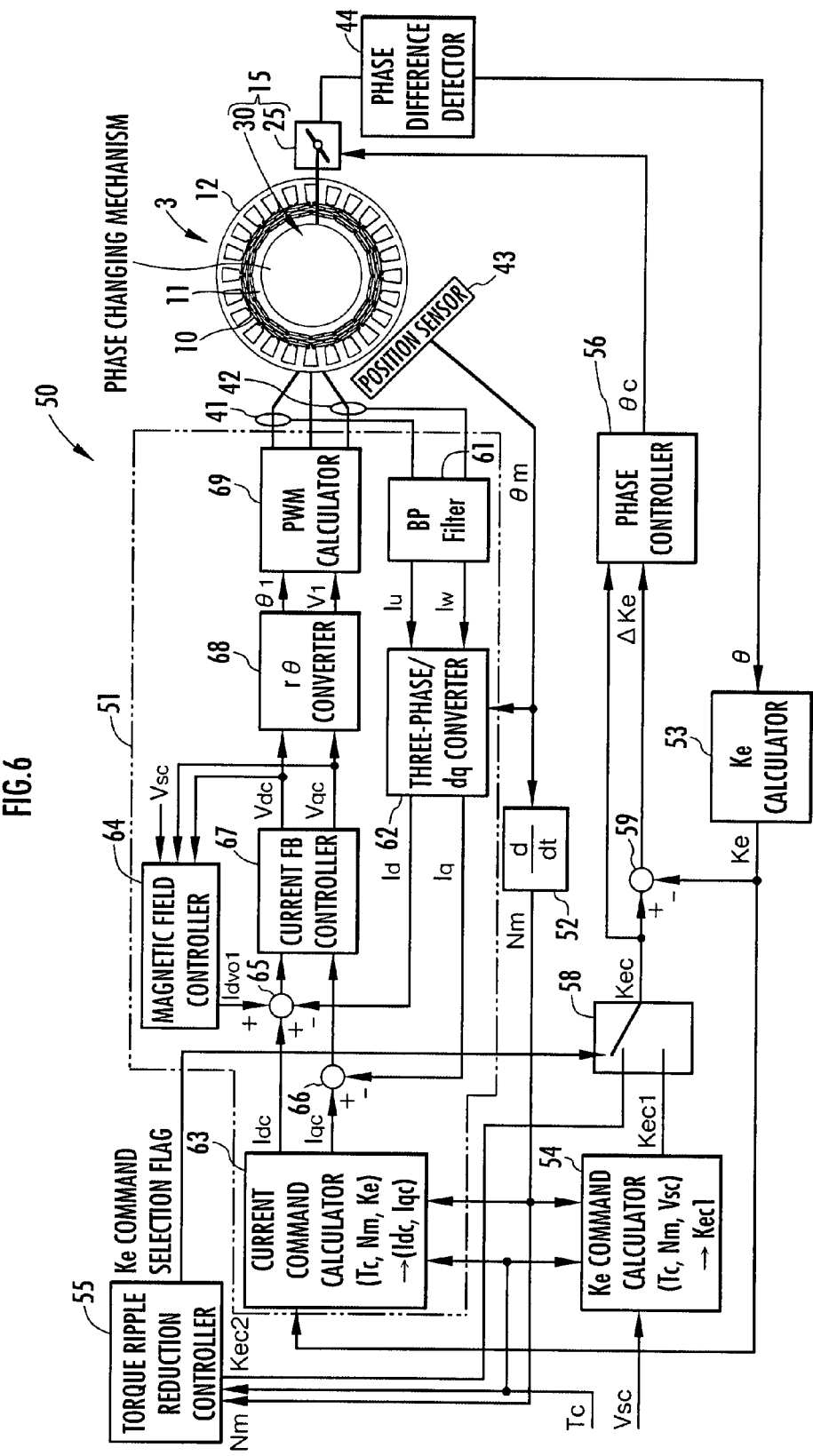
FIG. 6 is a block diagram showing a functional configuration of a controller for a motor according to the embodiment.
Figure 7:
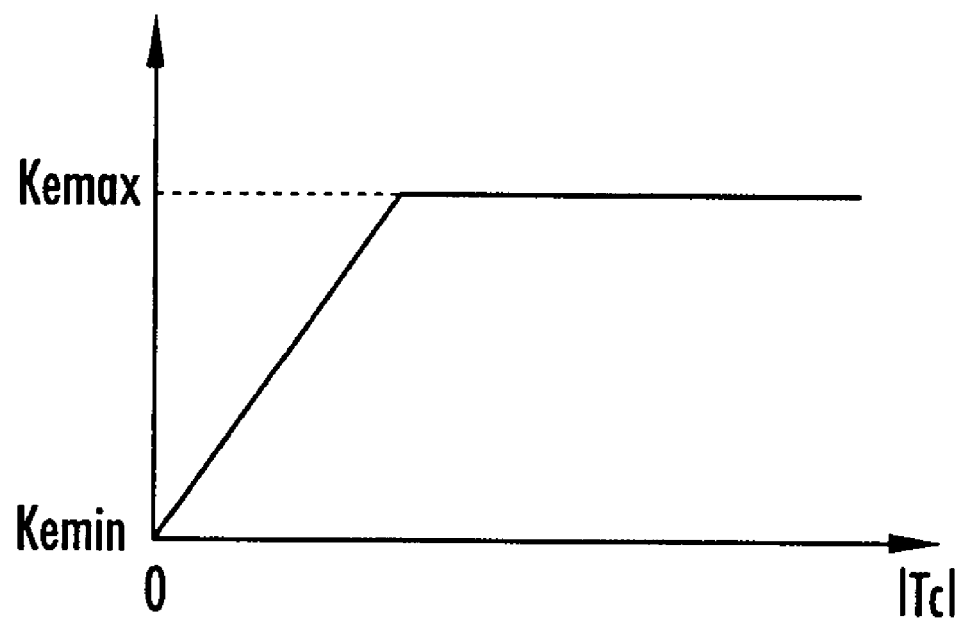
FIG. 7 is a graph for explaining a processing carried out by a Ke command calculator in the controller shown in FIG. 6.
Figure 8:
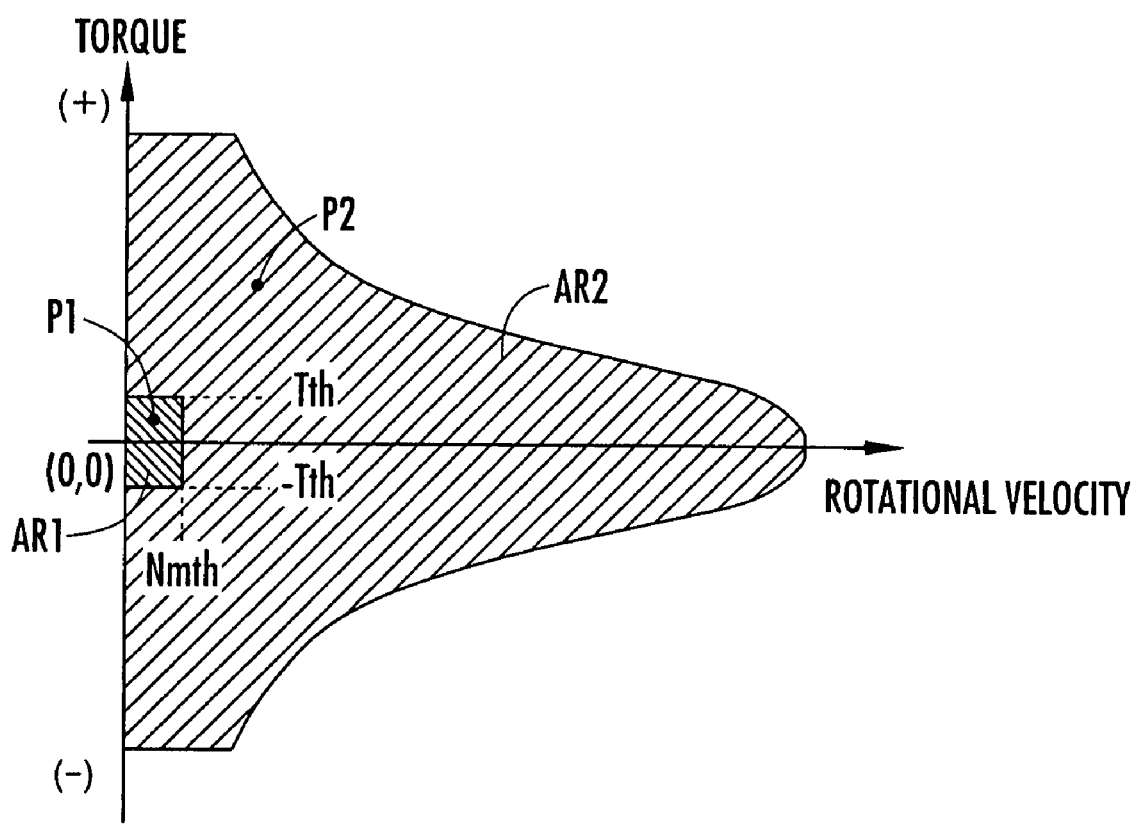
FIG. 8 is a graph for explaining a processing carried out by a torque ripple reduction controller in the controller shown in FIG. 6.
Figure 9:
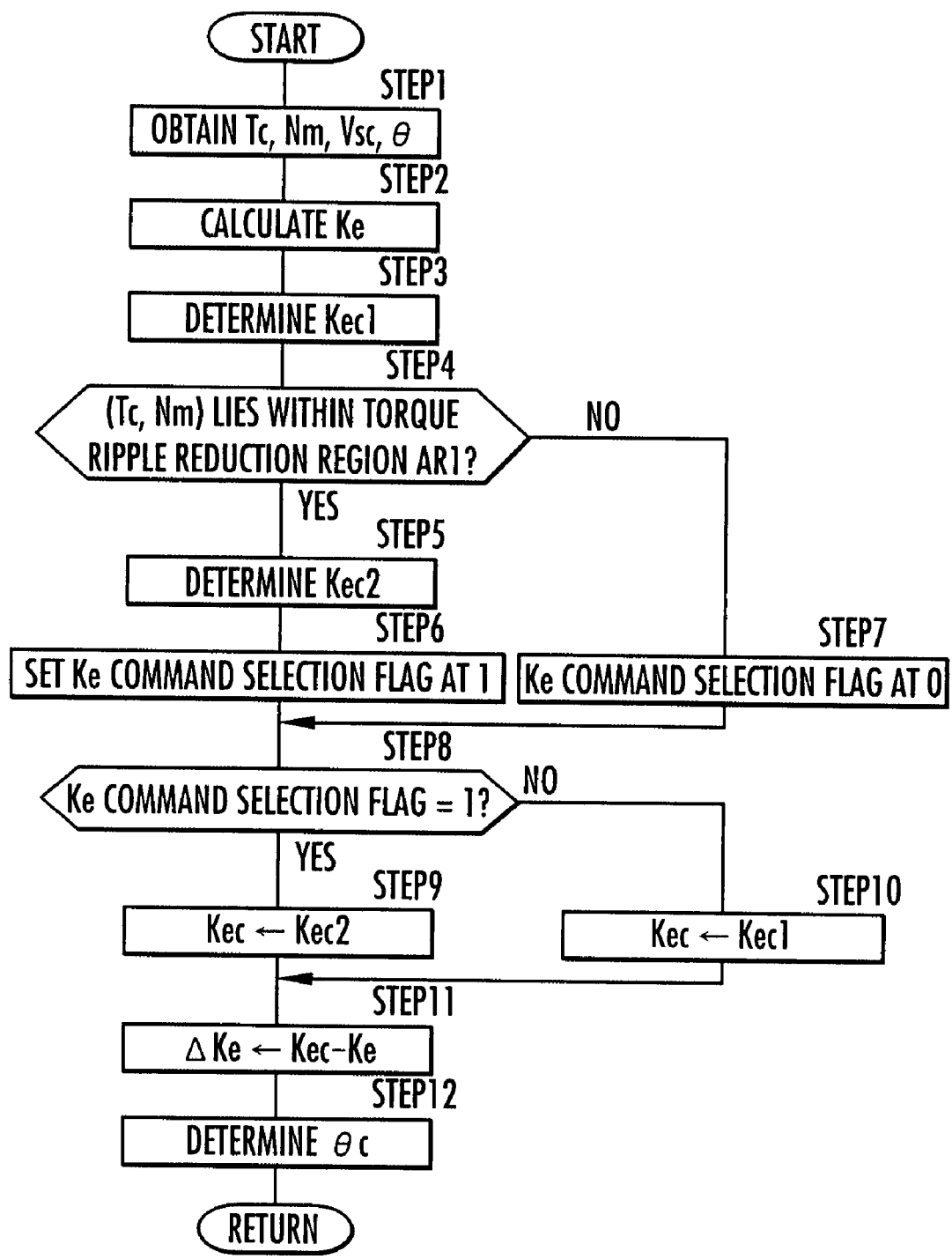
FIG. 9 is a flowchart illustrating a process for controlling the rotor phase difference of the motor carried out by the controller shown in FIG. 6.

Now, referring to FIGS. 6 to 9, a controller 50 for the motor 3 according to this embodiment will be described. FIG. 6 is a block diagram showing a functional configuration of the controller 50 for the motor 3 (referred to simply as controller 50, hereinafter), FIG. 7 is a graph for explaining a processing carried out by a Ke command calculator 54 in the controller 50, FIG. 8 is a graph for explaining a processing carried out by a torque ripple reduction controller 55 in the controller 50, and FIG. 9 is a flowchart illustrating a processing for controlling the rotor phase difference of the motor 3 carried out by the controller 50. In FIG. 6, the motor 3 is schematically shown, and the planetary gear mechanism 30 is described as a "phase changing mechanism".

Referring to FIG. 6, the controller 50 according to this embodiment controls energization to the motor 3 based on a so-called d-q vector control. Specifically, for processing, the controller 50 converts the motor 3 into an equivalent circuit based on a d-q coordinate system, which is a two-phase DC rotating coordinate system, in which the direction of field is indicated by a d-axis, while the direction orthogonal to the d-axis is indicated by a q-axis. The equivalent circuit has an armature on the d-axis (referred to as d-axis armature, hereinafter) and an armature on the q-axis (referred to as q-axis armature, hereinafter). The d-q coordinate system is a coordinate system fixed with respect to the output shaft $3a$ of the motor 3. The controller 50 controls an energizing current to the armatures (armatures for three phases) of the motor 3 so that the output shaft $3a$ of the motor 3 outputs a torque according to a torque command value Tc externally supplied. In parallel with the energization control, the controller 50 determines a command value Kec of the induced voltage constant of the motor 3 according to the torque command value Tc or the like, estimates the actual induced voltage constant of the motor 3 and controls the rotor phase difference via the phase difference changer 15 to make the estimated value Ke of the induced voltage constant agree with the command value Kec.

In order to achieve these control operations, according to this embodiment, there are disposed current sensors 41 and 42 (current detecting means) for detecting currents flowing through two of the armatures for three phases of the motor 3, for example, armatures for the U-phase and the W-phase, a position sensor 43 (rotational position detecting sensor) for detecting a rotational position θm (rotational angle) (=rotational angle of the outer rotor 10) of the output shaft $3a$ of the motor 3, and a phase difference detector 44 for detecting the rotor phase difference. The position sensor 43 is constituted by a resolver, for example. The phase difference detector 44 detects the rotor phase difference based on the rotational position (a target value or a detection value) of the first carrier C1 that is rotated by the actuator 25 of the phase difference changer 15, for example.

The controller 50 is an electronic unit comprising a CPU, a memory and the like and sequentially carries out the control processing at a predetermined calculation cycle. In the following, functional means of the controller 50 will be specifically described.

The controller 50 comprises, as main functional means, an energization controller 51 that controls an energizing current to the armature of each phase of the motor 3, a rotational velocity calculator 52 that determines a rotational velocity Nm of the output shaft $3a$ of the motor 3, a Ke calculator 53 that determines an estimated value Ke of the actual induced voltage constant of the motor 3 (referred to as induced voltage constant estimated value Ke, hereinafter), and a Ke command calculator 54 that determined a first command value Kec1 of the induced voltage constant (referred to as first induced voltage constant command value Kec1, hereinafter).

Furthermore, the controller 50 comprises a torque ripple reduction controller 55 that carries out a processing of determining and outputting a second command value Kec2 of the induced voltage constant (referred to as second induced voltage constant command value Kec2, hereafter) in a state where the motor 3 operates at a low velocity with a low torque, such as during creeping of the vehicle 1, and a process of determining and outputting the value of a Ke command selection flag that specifies which of the first induced voltage constant command value Kec1 and the second induced voltage constant command value Kec2 is used for controlling the rotor phase difference.

Furthermore, the controller 50 comprises a phase controller 56 that determines a control command for controlling the rotor phase difference and outputs the control command to the phase difference changer 15, an induced voltage constant command selector 58 that selectively outputs a command value Kec of the induced voltage constant actually used by the phase controller 56 for controlling the rotor phase difference (referred to as induced voltage constant actual command value Kec, hereinafter), which is selected from the first induced voltage constant command value Kec1 and the second induced voltage constant command value Kec2, and a calculator 59 that determines a difference ΔKe (=Kec−Ke) between the induced voltage constant actual command value Kec and the induced voltage constant estimated value Ke.

Detection values of the rotational position θm of the output shaft $3a$ of the motor 3 (rotational position of the outer rotor 10) detected by the position sensor 43 are sequentially input to the rotational velocity calculator 52. The rotational velocity calculator 52 carries out differentiation of the input detection value of the rotational position θm, thereby calculating the rotational velocity Nm of the output shaft $3a$ of the motor 3.

Detection values of the rotor phase difference θ are sequentially input to the Ke calculator 53 from the phase difference detector 44. The Ke calculator 53 determines the induced voltage constant estimated value Ke from the input detection value of the rotor phase difference θ based on a predefined data table. According to this embodiment, as described above, as the rotor phase difference increases from 0 [deg] to 180 [deg], the strength of the composite field of the permanent magnets 13, 14 of the rotors 10, 11 monotonously decreases. Therefore, the induced voltage constant of the motor 3 monotonously decreases as the rotor phase difference increases. Thus, the data table is configured so that the induced voltage constant estimated value Ke monotonously decreases as the rotor phase difference increases.

The torque command value Tc (command value of the output torque to be produced by the output shaft $3a$ of the motor 3), a power supply voltage Vsc (target value) of the motor 3, and the rotational velocity Nm determined by the Ke calculator 53 are sequentially input to the Ke command calculator 54. The torque command value Tc and the power supply voltage Vsc are determined outside the controller 50 according to this embodiment. The torque command value Tc is set according to the amount of manipulation of the accelerator (the amount of depression of the accelerator pedal), the traveling velocity or the like of the vehicle 1. According to this embodiment, the torque command value Tc of a power running torque is a positive value, and the torque command value Tc of a regenerative torque is a negative value. The power supply voltage Tsc is set according to the detection value of the output voltage of a capacitor (not shown) mounted on the vehicle 1 as a power supply for the motor 3.

The Ke command calculator 54 sequentially determines the first induced voltage constant command value Kec1 based on a map previously defined from the input values Tc, Nm and Vsc.

In this case, the map described above is defined so that, for a set of the torque command value TC, the rotational velocity Nm (detection value) and the power supply voltage Vsc, there is determined a first induced voltage constant command value Kec1 that maximizes the energy efficiency (ratio of the output energy to the input energy) of the motor 3 while preventing the magnitude of the composite voltage (vector sum) of the voltages generated by the d-axis armature and the q-axis armature of the motor 3 from exceeding the power supply voltage Vsc.

In general, as the induced voltage constant decreases (in other words, as the rotor phase difference increases), the output shaft 3a of the motor 3 can be rotated in a higher velocity range, and the motor 3 can operate with a high energy efficiency at higher rotational velocities. Furthermore, as the induced voltage constant increases (in other words, as the rotor phase difference decrease), the motor 3 can produce larger torque. Thus, the first induced voltage constant command value Kec1 can be set taking into account the characteristics of the motor 3 concerning the induced voltage constant described above and the required operational state of the motor 3 and can be set in various ways.

According to this embodiment, if the rotational velocity Nm of the output shaft 3a and the power supply voltage Vsc are constant, the Ke command calculator 54 sets the first induced voltage constant command value Kec1 so that the first induced voltage constant command value Kec1 increases between a minimum induced voltage constant Kemin, which corresponds to the minimum field state, and a maximum induced voltage constant Kemax, which corresponds to the maximum field state, (in other words, the strength of the composite field of the permanent magnets 13, 14 of the rotors 10, 11 increases) as the absolute value |Tc| of the torque command value Tc increases, as shown in the graph in FIG. 7.

As for change of the first induced voltage constant command value Kec1 with the rotational velocity Nm, basically, the first induced voltage constant command value Kec1 is set so that, if the torque command value Tc and the power supply voltage Vsc are constant, the first induced voltage constant command value Kec1 decreases (in other words, the strength of the composite field of the permanent magnets 13, 14 of the rotors 10, 11 decreases) as the rotational velocity Nm increases in a high rotational velocity range. As for change of the first induced voltage constant command value Kec1 with the power supply voltage Vsc, basically, the first induced voltage constant command value Kec1 is set so that, if the torque command value Tc and the rotational velocity Nm are constant, the first induced voltage constant command value Kec1 decreases as the power supply voltage Vsc decreases.

Complementally, the first induced voltage constant command value Kec1 may be set taking into account a requirement concerning prevention of overheating of the motor 3.

The torque command value Tc and the rotational velocity Nm determined by the rotational velocity calculator 52 are sequentially input to the torque ripple reduction controller 55. The torque ripple reduction controller 55 determines whether or not the required operational state of the motor 3 is the low-velocity and low-torque operational state in which a change in torque produced by the motor 3 (torque ripple) has to be reduced, based on the input torque command value Tc and the rotational velocity Nm. According to whether or not the operational state of the motor 3 is the low-velocity and low-torque operational state, the torque ripple reduction controller 55 sets the value of the Ke command selection flag and outputs the Ke command selection flag to the induced voltage constant command selector 58. In addition, the torque ripple reduction controller 55 determines the second induced voltage constant command value Kec2, which is a command value of the induced voltage constant at the time when the operational state of the motor 3 is the low-velocity and low-torque operational state, and outputs the second induced voltage constant command value Kec2 to the induced voltage constant command selector 58.

Referring to FIG. 8, according to this embodiment, the torque ripple reduction controller 55 determines that the operational state of the motor 3 is the low-velocity and low-torque operational state in which a change in torque produced by the motor 3 (torque ripple) has to be reduced, when a point (Tc, Nm) on a two-axis coordinate plane determined by the input torque command value Tc and rotational velocity Nm lies within a predetermined region AR1 on the two-axis coordinate plane. Hereinafter, the region AR1 will be referred to as torque ripple reduction region. The two-axis coordinate plane shown in FIG. 8 is a coordinate plane in which the axis of ordinates indicates the torque, and the axis of abscissas indicates the rotational velocity. A region AR2 in FIG. 8 (including the region AR1) represents an operative region of the motor 3, and the motor 3 operates at a point in the operative region AR2. The curve defining the boundary of the operative region AR2 represents a line on which the output of the motor 3 is at the maximum.

As shown in FIG. 8, the torque ripple reduction region AR1 is set in the proximity of the origin (0, 0) of the two-axis coordinate plane including the origin (0, 0). According to this embodiment, the torque ripple reduction region AR1 is a region (rectangular region) for which the magnitude (absolute value) of the torque is equal to or smaller than a predetermined threshold Th, and the rotational velocity is equal to or lower than a predetermined threshold Nmth. The thresholds Th and Nmth correspond to the set torque and the set velocity according to the second aspect of the present invention, respectively.

The torque ripple reduction controller 55 determines that the required operational state of the motor 3 is the low-velocity and low-torque operational state in which the torque ripple has to be reduced, when the point (Tc, Nm) on the two-axis coordinate plane corresponding to the set of the input torque command value Tc and rotational velocity Nm lies within the torque ripple reduction region AR1 as shown by a point P1 in FIG. 8 (in other words, when |Tc|≦Th, and Nm≦Nmth), for example. In this case, the value of the Ke command selection flag is set at "1". The torque ripple reduction controller 55 determines that the required operational state of the motor 3 is not the low-velocity and low-torque operational state in which the torque ripple has to be reduced, when the point (Tc, Nm) on the two-axis coordinate plane corresponding to the set of the input torque command value Tc and rotational velocity Nm does not lie within the torque ripple reduction region AR1 as shown by a point P2 in FIG. 8 (in other words, when |Tc|>Th, or Nm>Nmth), for example. In this case, the value of the Ke command selection flag is set at "0". Furthermore, the torque ripple reduction controller 55 set a previously defined predetermined value as the second induced voltage constant command value Kec2. According to this embodiment, the predetermined value is smaller than the maximum induced voltage constant Kemax and larger than the minimum induced voltage constant Kemin (a value between Kemax and Kemin).

While the torque ripple reduction region AR1 is rectangular in this embodiment, the torque ripple reduction region AR1 may be semi-circular, for example. In general, any torque ripple reduction region AR1 may be set as far as a significant torque ripple of the motor 3 appears when the motor 3 operates at an operating point in the region AR1 with the rotor phase difference of the motor 3 being minimized (in other words, the composite field of the permanent magnets 13, 14 being maximized).

Complementarily, according to this embodiment, when the amount of manipulation of the accelerator of the vehicle 1 is 0, and the traveling velocity is substantially 0, the torque command value Tc is set at a predetermined idling torque. The idling torque is a slight power running torque (positive value). The value of the idling torque is contained in the torque ripple reduction region AR1.

The first induced voltage constant command value Kec1 determined by the Ke command calculator 54 and the second induced constant command value Kec2 and the Ke command selection flag value determined by the torque ripple reduction controller 55 are input to the induced voltage constant command selector 58. According to the value of the Ke command selection flag, the induced voltage constant command selector 58 outputs one of the first induced voltage constant command value Kec1 and the second induced voltage constant command value Kec2 as the induced voltage constant actual command value Ke to the calculator 59. Specifically, when the value of the Ke command selection flag is "0" (when the operational state of the motor 3 is not the low-velocity and low-torque operational state in which the torque ripple has to be reduced), the first induced voltage constant command value Kec1 is output as the induced voltage constant actual command value Kec. When the value of the Ke command selection flag is "1" (when the operational state of the motor 3 is the low-velocity and low-torque operational state in which the torque ripple has to be reduced), the second induced voltage constant command value Kec2 is output as the induced voltage constant actual command value Kec.

The difference $\Delta Ke$ ($=Kec-Ke$) calculated by the calculator 59 and the induced voltage constant actual command value Kec output from the induced voltage constant command selector 58 are input to the phase controller 56. Based on these input values, the phase controller 56 determines a control command to converge the difference $\Delta Ke$ to 0, which is to be directed to the phase difference changer 15, and outputs the control command to the phase difference changer 15. According to this embodiment, as the control command, a command value $\theta c$ of the rotor phase difference (referred to as rotor phase difference command value $\theta c$) is determined, for example. In this case, the rotor phase difference command value $\theta c$ is determined by correcting a feedforward value determined according to the value Kec with a feedback correction amount determined according to the value $\Delta Ke$. The feedforward value can be determined using a data table similar to the data table used by the Ke calculator 53. The feedback correction amount can be determined from the value $\Delta Ke$ according to a feedback control rule, such as proportional feedback and PID feedback.

The phase difference changer 15 controls the rotor phase difference $\theta$ via the actuator 25 according to the rotor phase difference command value $\theta c$ input from the phase controller 56.

Complementarily, while the rotor phase difference command value $\theta c$ is used as the control command for the phase difference changer 15 in this embodiment, a command value of the amount of operation of the actuator 25 of the phase difference changer 15 may be used. Any control command can be used as far as the control command defines the operation of the actuator 25 of the phase difference changer 15.

According to this embodiment, the torque ripple reduction controller 55, the Ke command calculator 54, the induced voltage constant command selector 58, the calculator 59, the Ke calculator 53 and the phase controller 56 constitute phase difference controlling means according to the present invention.

The energization controller 51 controls the energizing current to the armature of each phase of the motor 3 in such a manner that the output torque of the motor 3 (the torque produced by the output shaft 3a) agrees with the torque command value Tc.

In order to achieve this control, the energization controller 51 has a band-pass filter 61 that removes an unwanted component from the output signals of the current sensors 41, 42 to provide current detection values Iu and Iw for the armatures for the U phase and W phase of the motor 3 and a three-phase/dq converter 62 that calculates a detection value Id of the current of the d-axis armature (referred to as d-axis current, hereinafter) and a detection value Iq of the current of the q-axis armature (referred to as q-axis current, hereinafter) by three-phase/dq conversion based on the current detection values Iu and Iw and the rotational position $\theta m$ of the output shaft 3a detected by the position sensor 43.

Furthermore, the energization controller 51 has a current command calculator 63 that determines a d-axis current command value Idc, which is a command value of the d-axis current, and a q-axis current command value Iqc, which is a command value of the q-axis current, a field controller 64 that determines a correction value $\Delta Idvol$ for correcting the d-axis current command value Idc determined by the current command calculator 63, a calculator 65 that determines a difference $\Delta Id$ ($=Idc+\Delta Idvol-Id$) between the sum of the d-axis current command value Idc and the correction value $\Delta Idvol$ (the value of Idc corrected with $\Delta Idvol$) and the detection value Id of the d-axis current determined by the three-phase/dq converter 62, and a calculator 66 that determines a difference $\Delta Iq$ ($=Iqc-Iq$) between the q-axis current command value Iqc and the detection value Iq of the q-axis current determined by the three-phase/dq converter 62.

The field controller 52 adjusts the d-axis current to make the magnitude of the phase voltage (induced voltage) in the armatures of the motor 3 agree with the power supply voltage Vsc. Thus, the power supply voltage Vsc of the motor 3, and a d-axis voltage command value Vdc and a q-axis voltage command value Vqc, which are voltage command values for the d-axis armature and the q-axis armature determined by a current feedback controller 67 described later, respectively, are input to the field controller 52. The input values Vdc and Vqc are previous values (values determined in the previous calculation cycle). The field controller 52 determines the correction value $\Delta Idvol$ for adjusting the d-axis current Id so that the phase voltage determined from the input d-axis voltage command value Vdc and q-axis voltage command value Vqc traces a target voltage circle determined from the power supply voltage Vsc (or in other words, so that the magnitude of the composite vector of the values Vdc and Vqc equals to the radius Vdc of the target voltage circle).

Furthermore, the energization controller 51 has the current feedback controller 67 that determines the d-axis voltage command value Vdc and the q-axis voltage command value Vqc according to a feedback controlling rule, such as PI control, so that the differences $\Delta Id$ and $\Delta Iq$ calculated as described above approaches 0. Preferably, the d-axis voltage command value Vdc and the q-axis voltage command value Vqc are determined by adding a noninterference component for canceling an influence of speed electromotive forces that interfere with each other between the d-axis and the q-axis to the d-axis voltage command value and the q-axis voltage command value determined from the differences ΔId and ΔIq according to the feedback controlling rule, such as PI control, respectively.

Furthermore, the controller 50 comprises an rθ converter 68 that converts a vector composed of the d-axis voltage command value Vdc and the q-axis voltage command value Vqc into a magnitude component V1 and an angle component θ1 and a PWM calculator 69 that converts the magnitude component V1 and the angle component θ1 into a three-phase AC voltage by PWM control to energize the armature of each phase of the motor 3. Although not shown in FIG. 6, to convert the components V1 and θ1 into the AC voltage for the armature of each phase of the motor 3, the rotational position θm of the output shaft 3a detected by the position sensor 43 is input to the PWM calculator 69.

By the function of the energization controller 51 described above, the energizing current to the armature of each phase of the motor 3 is controlled so that the output torque of the motor 3 agrees with the torque command value Tc (or the differences ΔId and ΔIq converge to 0).

In the following, an entire process of controlling the rotor phase difference of the motor 3 by the controller 50 will be described with reference to the flowchart of FIG. 9.

In each control cycle, the controller 50 carries out steps shown in the flowchart of FIG. 9, thereby controlling the rotor phase difference of the motor 3 via the phase difference changer 15.

First, the controller 50 obtains the torque command value Tc, the rotational velocity Nm of the output shaft 3a of the motor 3, the power supply voltage Vsc, and the detection value θ of the rotor phase difference (STEP 1). The values Tc, Nm and Vsc are used as input values of the Ke command calculator 54, and the values Tc and Nm are used as input values of the torque ripple reduction controller 55. The value θ is used as an input value of the Ke calculator 53.

Then, the controller 50 makes the Ke calculator 53 calculate the estimated value Ke of the actual current induced voltage constant of the motor 3 (STEP 2). In addition, the controller 50 makes the Ke command calculator 54 determine the first induced voltage constant command value Kec1 (STEP 3).

Then, the controller 50 makes the torque ripple reduction controller 55 carry out STEPs 4 to 7. The torque ripple reduction controller 55 first determines whether or not the set (Tc, Nm) of the torque command value Tc and the rotational velocity Nm input thereto lies within the torque ripple reduction region AR1 as described above (STEP 4). If the result of the determination is "YES", that is, if the required operational state of the motor 3 is the low-velocity and low-torque operational state in which the torque ripple has to be reduced, the torque ripple reduction controller 55 sets the second induced voltage constant command value Kec2 at a predetermined value between the maximum induced voltage constant Kemax and the minimum induced voltage constant Kemin as described above (STEP 5). Furthermore, the torque ripple reduction controller 55 sets the value of the Ke command selection flag at "1" (STEP 6). On the other hand, if the result of the determination in STEP 4 is "NO", that is, if the required operational state of the motor 3 is not the low-velocity and low-torque operational state in which the torque ripple has to be reduced, the torque ripple reduction controller 55 sets the Ke command selection flag at 0" (STEP 7).

The order of the processing carried out by the Ke calculator 53 (STEP 2), the processing carried out by the Ke command calculator 54 (STEP 3) and the processing carried out by the torque ripple reduction controller 55 (STEPs 4 to 7) can be changed.

After STEPs 1 to 7 are carried out as described above, the controller 50 makes the induced voltage constant command selector 58 carry out STEPs 8 to 10. The induced voltage constant command selector 58 determines whether or not the value of the Ke command selection flag is "1" (STEP 8). If the result of the determination is "YES" (if the required operational state of the motor 3 is the low-velocity and low-torque operational state), the induced voltage constant command selector 58 sets the second induced voltage constant command value Kec2 as the induced voltage constant command value Kec (STEP 9). If the result of the determination in STEP 8 is "NO" (if the required operational state of the motor 3 is not the low-velocity and low-torque operational state), the induced voltage constant command selector 58 sets the first induced voltage constant command value Kec1 as the induced voltage constant command value Kec (STEP 10).

While the Ke command selection flag is used in this embodiment, STEPs 6, 7 and 8 may be omitted, and STEP 9 may be carried out if the result of the determination in STEP 4 is "YES", and STEP 10 may be carried out if the result of the determination in STEP 4 is "NO".

Then, the controller 50 makes the calculator 59 calculate the difference ΔKe (=Kec−Ke) between the induced voltage constant actual command value Kec and the estimated value Ke of the actual induced voltage constant (STEP 11).

Then, the controller 50 makes the phase controller 53 determine the rotor phase difference command value θc as a control command for the phase difference changer 15 (STEP 12).

The rotor phase difference is controlled as described above.

The rotor phase difference command value θc sequentially determined as described above is output to the phase difference changer 15. Then, the phase difference changer 15 controls the rotor phase difference according to the rotor phase difference command value θc. Specifically, the phase difference changer 15 rotationally drives the second carrier C2 of the planetary gear mechanism 30 by means of the actuator 25 so that the actual rotor phase difference of the motor 3 is equal to the rotor phase difference command value θc.

The processing by the energization controller 51 is carried out as described above in parallel with the process shown in the flowchart of FIG. 9 (or in a time sharing manner). Thus, the energizing current to the armature of each phase of the motor 3 is controlled so that the output shaft 3a of the motor 3 produces a torque according to the torque command value Tc.

With the arrangement according to this embodiment described above, in the low-velocity and low-torque operational state in which the set of the torque command value Tc and the rotational velocity Nm of the motor 3 lies within the torque ripple reduction region, the induced voltage constant actual command value Ke is set at a value smaller than the maximum induced voltage constant Kemax (=the second induced voltage constant command value Kec2). And, the rotor phase difference is adjusted to a phase difference corresponding to the second induced voltage constant command value Kec2 (which corresponds to a predetermined phase difference according to the present invention) by the rotor phase difference control described above. Thus, the strength of the composite field of the permanent magnets 13 and 14 of the rotors 10 and 11 is lower than the strength at the time of the maximum field state. As a result, a change in torque (torque ripple) produced by the motor 3 in the low-velocity and low-torque operational state can be reduced.

Figure 10:
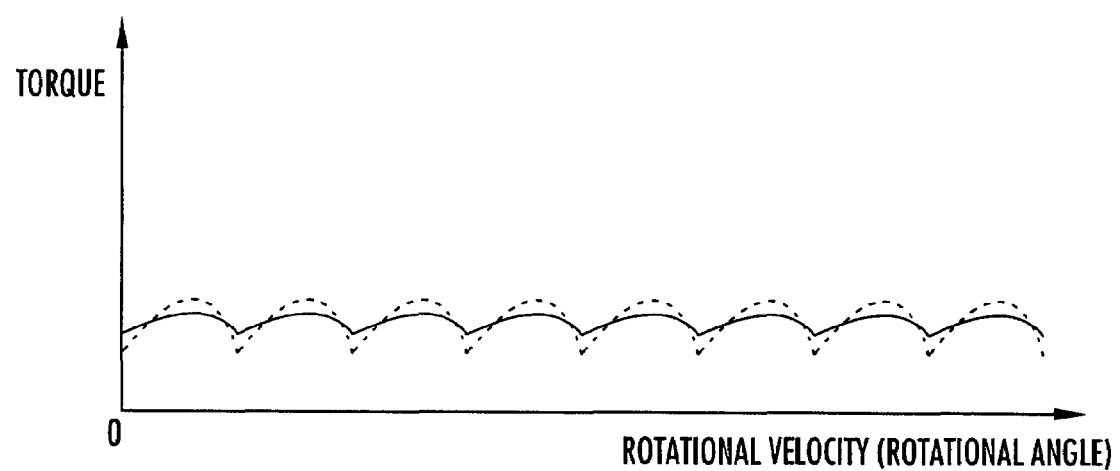
FIG. 10 is a graph showing a change in torque produced by the motor (torque ripple) in a low-velocity and low-torque operational state.

This reduction will be described with reference to FIG. 10. In FIG. 10, the graph shown by dashed line shows a change in torque produced by the motor 3 with a change in rotational position (rotational angle) of the output shaft 3a in a case where the rotor phase difference is kept at 180 [deg] (where the composite field is in the maximum field state), and the graph shown by solid line shows a change in torque produced by the motor 3 with a change in rotational position (rotational angle) of the output shaft 3a in a case where the rotor phase difference is kept at a phase difference corresponding to the second induced voltage constant command value Kec2. For these graphs, the torque command value Tc and the rotational velocity Nm of the output shaft 3a of the motor 3 are constant values which lie within the torque ripple reduction region.

As shown by the dashed-line graph, in the maximum field state, a torque ripple having a relatively large amplitude occurs. On the other hand, in the case where the rotor phase difference is adjusted to a phase difference corresponding to the second induced voltage constant command value Kec2 to reduce the strength of the composite field, as shown by the solid-line graph, the amplitude of the torque ripple is reduced, and the torque ripple is reduced.

In this embodiment, as described above, when the amount of manipulation of the accelerator of the vehicle 1 is 0, and the traveling velocity thereof is substantially 0, the torque command value Tc is set at the predetermined idling torque. Therefore, if the brakes are released or the force of depressing the brake pedal is weakened when the vehicle 1 is temporarily stopped by carrying out the braking operation of the vehicle 1 (depressing the brake pedal), the idling torque is transmitted to the drive wheels 7, 7 of the vehicle 1 via the transmission 5. As a result, the so-called creeping of the vehicle 1 occurs. The torque command value Tc and the rotational velocity Nm of the output shaft 3a of the motor 3 during creeping lie within the torque ripple reduction region. Therefore, the torque ripple is reduced when the motor 3 is in the low-velocity and low-torque operational state including the time when the vehicle 1 is creeping.

Furthermore, in this embodiment, the second induced voltage constant command value Kec2 is set at a value that is larger than the minimum induced voltage constant Kemin and lies between the minimum induced voltage constant Kemin and the maximum induced voltage constant Kemax. Therefore, in the low-velocity and low-torque operational state in which the torque ripple has to be reduced, the rotor phase difference is controlled so that the composite field has a moderate strength between those in the maximum field state and the minimum field state. Thus, the rotor phase difference can be controlled in such a manner that, during operation of the motor 3 in the low-velocity and low-torque operational state, the torque command value Tc can be increased according to the amount of depression of the accelerator pedal of the vehicle 1, and a strength of the composite field required by the motor 3 to smoothly produce the torque according to the torque command value Tc can be quickly achieved. That is, the time required by the phase difference changer 15 to change the rotor phase difference from the rotor phase difference in the low-velocity and low-torque operational state (the phase difference corresponding to the second induced voltage constant command value Kec2) to the rotor phase difference for which the strength of the composite field is higher (the phase difference close to 0 [deg]) can be reduced. In other words, according to this embodiment, the second induced voltage constant command value Kec2 is determined so that the torque ripple can be sufficiently reduced when the motor 3 is in the low-velocity and low-torque operational state, such as during creeping, and a delay in control of change of the rotor phase difference that occurs if the torque command value Tc significantly increases when the motor 3 is in the low-velocity and low-torque operational state is minimized. Thus, substantial reduction of the torque ripple and high control responsibility of the rotor phase difference can be both achieved.

Furthermore, in this embodiment, if the set of the torque command value Tc and the rotational velocity Nm does not lie within the torque ripple reduction region AR1, the first induced voltage constant command value Kec1 is set as the induced voltage constant actual command value Kec. In this case, in particular, since the first induced voltage constant command value Kec1 is set higher as the torque command value Tc increases, the strength of the composite field of the motor 3 can be set at a strength suitable for the torque command value Tc.

In the embodiment described above, the induced voltage constant command values Kec1 and Kec2 are determined, and then the rotor phase difference is controlled so that the induced voltage constant estimated value Ke follows one of the command values Kec1 and Kec2. However, for example, command values of the rotor phase difference that correspond to the induced voltage constant command values Kec1 and Kec2, respectively, may be determined, and the rotor phase difference may be controlled so that the actual rotor phase difference (the detection value by the phase difference detector 44) follows one of the command values.

Furthermore, in the embodiment described above, the induced voltage constant command values Kec1 and Kec2 are separately determined by the Ke command calculator 54 and the torque ripple reduction controller 55. However, the Ke command calculator 54 may determine both the induced voltage constant command value for the low-velocity and low-torque operational state and induced voltage constant command values for other operational states. In this case, the torque ripple reduction controller 55 and the induced voltage command selector 59 in FIG. 6 are not necessary.

Furthermore, in the embodiment described above, the position sensor 43 is provided for detecting the rotational position (rotational angle) of the output shaft 3a of the motor 3. However, the rotational position may be estimated by a so-called sensorless control method.

Furthermore, in the embodiment described above, when the set of the torque command value Tc and the rotational velocity Nm lies within the torque ripple reduction region AR1, the second induced voltage constant command value Kec2 is always adopted as the induced voltage constant actual command value Ke. However, the second induced voltage constant command value Kec2 may be adopted as the induced voltage constant actual command value Ke only during creeping of the vehicle 1. In this case, whether the vehicle 1 is creeping or not can be determined based on the amount of manipulation of the brake of the vehicle 1 (the force of depressing the brake pedal) or the amount of manipulation of the accelerator (the amount of depression of the accelerator pedal).

Furthermore, for the embodiment described above, a case where the present invention is applied to the electric-powered vehicle 1 having the motor 3 as a propulsion force generating source has been described. However, for example, the present invention may be applied to a parallel-type hybrid vehicle having an engine and a motor as a propulsion force generating source.

What is claimed is:

1. A controller for a motor that has a first rotor and a second rotor, each of which produces a field by a permanent magnet, and an output shaft capable of rotating integrally with the first rotor of the rotors, which are coaxially disposed, said second rotor being capable of relatively rotating with respect to said first rotor, and the strength of a composite field of the fields of the permanent magnets of the rotors being capable of being changed by changing the phase difference between the rotors by the relative rotation of the second rotor, the controller comprising:

a phase difference changing driving means that has an actuator that produces a driving force to make said second rotor relatively rotate with respect to said first rotor; and a phase difference controlling means for controlling the phase difference between the rotors to a predetermined phase difference for which the strength of said composite field is lower than a maximum strength thereof via said phase difference changing driving means in the case where a point on a two-axis coordinate plane, whose coordinate axes indicate the torque produced on said output shaft and the rotational velocity of said output shaft, that represents a set of the value of the torque produced on said output shaft and the value of the rotational velocity of said output shaft lies within a preset predetermined region on the two-axis coordinate plane that is in the proximity of and includes the origin of the two-axis coordinate plane.

2. The controller for a motor according to claim 1, wherein said predetermined phase difference is set at a phase difference for which the strength of said composite field is higher than a minimum strength thereof.

3. The controller for a motor according to claim 1, wherein, in the case where the point on said two-axis coordinate plane corresponding to the set of the value of the torque produced on said output shaft and the value of the rotational velocity of the output shaft does not lie within said predetermined region, said phase difference controlling means controls said rotor phase difference via said phase difference changing driving means so that the strength of said composite field increases as the absolute value of the value of the torque produced on said output shaft increases.

4. A controller for a motor that has a first rotor and a second rotor, each of which produces a field by a permanent magnet, and an output shaft capable of rotating integrally with the first rotor of the rotors, which are coaxially disposed, said second rotor being capable of relatively rotating with respect to said first rotor, and the strength of a composite field of the fields of the permanent magnets of the rotors being capable of being changed by changing the phase difference between the rotors by the relative rotation of the second rotor, the controller comprising:

a phase difference changing driving means that has an actuator that produces a driving force to make said second rotor relatively rotate with respect to said first rotor; and a phase difference controlling means for controlling the phase difference between the rotors to a predetermined phase difference for which the strength of said composite field is lower than a maximum strength thereof via said phase difference changing driving means in the case where the absolute value of the value of the torque produced on said output shaft is equal to or less than a predetermined set torque, and the value of the rotational velocity of said output shaft is equal to or less than a predetermined set velocity.

5. The controller for a motor according to claim 4, wherein said predetermined phase difference is set at a phase difference for which the strength of said composite field is higher than a minimum strength thereof.

6. The controller for a motor according to claim 4, wherein, in the case where the absolute value of the value of the torque produced on said output shaft exceeds said predetermined set torque, or in the case where the rotational velocity of said output shaft exceeds said predetermined set velocity, said phase difference controlling means controls said rotor phase difference via said phase difference changing driving means so that the strength of said composite field increases as the absolute value of the value of the torque produced on said output shaft increases.

7. A controller for a motor mounted on a vehicle as a propulsion force generating source, the motor having a first rotor and a second rotor, each of which produces a field by a permanent magnet, and an output shaft capable of rotating integrally with the first rotor of the rotors, which are coaxially disposed, said second rotor being capable of relatively rotating with respect to said first rotor, and the strength of a composite field of the fields of the permanent magnets of the rotors being capable of being changed by changing the phase difference between the rotors by the relative rotation of the second rotor, the controller comprising:

a phase difference changing driving means for making said second rotor relatively rotate with respect to said first rotor; and a phase difference controlling means for controlling the phase difference between the rotors of said motor to a predetermined phase difference for which the strength of said composite field is lower than a maximum strength thereof via said phase difference changing driving means at least in the case where the vehicle is creeping by the action of a torque produced by said motor.

8. The controller for a motor according to claim 7, wherein said predetermined phase difference is set at a phase difference for which the strength of said composite field is higher than a minimum strength thereof.

* * * * *